United States Patent
Sun et al.

(10) Patent No.: US 9,503,995 B2
(45) Date of Patent: Nov. 22, 2016

(54) METHOD AND SYSTEM FOR SYNCHRONOUS SERVICE-FLOW TRANSMISSION IN HETEROGENEOUS NETWORK

(75) Inventors: Aifang Sun, Shenzhen (CN); Chong Gao, Shenzhen (CN); Zhihao Ling, Shenzhen (CN); Yifeng Yuan, Shenzhen (CN); Jianfu Cao, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 326 days.

(21) Appl. No.: 14/358,021

(22) PCT Filed: Feb. 16, 2012

(86) PCT No.: PCT/CN2012/071209
§ 371 (c)(1),
(2), (4) Date: May 13, 2014

(87) PCT Pub. No.: WO2012/155557
PCT Pub. Date: Nov. 22, 2012

(65) Prior Publication Data
US 2014/0293951 A1     Oct. 2, 2014

(30) Foreign Application Priority Data
Dec. 20, 2011    (CN) .......................... 2011 1 0429360

(51) Int. Cl.
*H04W 56/00* (2009.01)
(52) U.S. Cl.
CPC ........... *H04W 56/001* (2013.01); *H04W 56/00* (2013.01)
(58) Field of Classification Search
None
See application file for complete search history.

(56) References Cited

U.S. PATENT DOCUMENTS

2006/0146745 A1*   7/2006   Cai .................... H04L 12/1881
                                                               370/328
2008/0205322 A1    8/2008   Cai
(Continued)

FOREIGN PATENT DOCUMENTS

CN           1913394 A      2/2007
CN         101043265 A      9/2007
(Continued)

OTHER PUBLICATIONS

Barbu, "An Enabler of Interoperability in Heterogeneous Wireless Networks", Feb. 28, 2011, IEEE, all pages.*

(Continued)

*Primary Examiner* — Kwang B Yao
*Assistant Examiner* — Adam Duda
(74) *Attorney, Agent, or Firm* — Oppedahl Patent Law Firm LLC

(57) ABSTRACT

The present disclosure discloses a method for synchronous service-flow transmission in a heterogeneous network, including that: an access point collects a parameter on a wireless-network channel, and reports the parameter to a synchronization managing unit of an access-network controller; the synchronization managing unit dynamically adjusts the received parameter on the wireless-network channel, and transmits the adjusted parameter to each service-flow channel to implement synchronization between different service-flows. The present disclosure also provides a system for synchronous service-flow transmission in a heterogeneous network. With a technical solution of the present disclosure, it is possible to implement synchronous service-flow transmission and reduce delay while increasing a system throughput.

6 Claims, 3 Drawing Sheets

(56) References Cited

U.S. PATENT DOCUMENTS

2011/0299423 A1 12/2011 Shim et al.
2013/0028161 A1 1/2013 Maeda et al.
2015/0071152 A1 3/2015 Maeda et al.

FOREIGN PATENT DOCUMENTS

| CN | 101299679 A | 11/2008 |
| CN | 102187622 A | 9/2011 |
| EP | 2053761 A1 | 4/2009 |
| WO | 2011135825 A1 | 11/2011 |

OTHER PUBLICATIONS

Wikipedia, "Databases", Dec. 19, 2011, Wikipedia, all pages.*
International Search Report in international application No. PCT/CN2012/071209, mailed on May 31, 2012. (2 pages—see entire document).
English Translation of the Written Opinion of the International Search Authority in international application No. PCT/CN2012/071209, mailed on May 31, 2012. (6 pages—see entire document).
Supplementary European Search Report in European application No. 12786462.7, mailed on May 6, 2015.

* cited by examiner

METHOD AND SYSTEM FOR SYNCHRONOUS SERVICE-FLOW TRANSMISSION IN HETEROGENEOUS NETWORK

TECHNICAL FIELD

The present disclosure relates to the field of wireless communication, and in particular to a method and system for synchronous service-flow transmission in a heterogeneous network.

BACKGROUND

In an environment of a ubiquitous network, various heterogeneous networks are integrated for real and cooperate with each other in serving a user. Service-flows processed cooperatively by multiple terminals in multiple networks are associated with, or independent from, each other. Compared with independent service-flows, synchronization between associated service-flows is required. Such synchronization is involved in two processes; one process is of transfer from a service-providing server to an access-network terminal through an access network, wherein the access-network terminal is for example an access-network gateway or another terminal device directly accessing a communication network; the other process is of transmission from each access-network terminal to a destination terminal. Currently, in a research on terminal aggregation based on environmental context projected by the committee on ubiquitous network technology (TC10) of China Communication Standards Association (CCSA), access-network terminals form a virtual terminal and work cooperatively; the access-network terminals in the virtual terminal include a controlling device and member devices, and synchronization will be required in transmitting sub-service-flows downloaded by member devices to the controlling device.

According to prior investigation, synchronization in the two processes is implemented only by the destination terminal of a service, that is, synchronization is implemented by caching a received service-flow in a cache set in the destination terminal, and presenting service packets to the user only after all the service packets are received. Such synchronization implemented on the destination terminal forces a service-flow with a fast processing rate to wait for a service-flow with a slow processing rate, thereby increasing delay and reducing a system throughput while failing to prevent a certain unexpected random event encountered during transmission, such as packet loss in competition, unexpected delay and the like.

SUMMARY

In view of this, it is desired that embodiments of the disclosure provide a method and system for synchronous service-flow transmission in a heterogeneous network, capable of implementing synchronous service-flow transmission, reducing delay as well as increasing a system throughput.

Accordingly, a technical solution of the disclosure is implemented as follows.

An embodiment of the disclosure provides a system for synchronous service-flow transmission in a heterogeneous network, comprising an access point and an access-network controller, wherein the access-network controller includes a synchronization managing unit, the access point is configured to collect a parameter on a wireless-network channel, and report the parameter on the wireless-network channel to the synchronization managing unit; and the synchronization managing unit is configured to dynamically adjust the received parameter on the wireless-network channel, and transmit the adjusted parameter to each service-flow channel to implement synchronization between service-flows.

In an embodiment, the synchronization managing unit may further include: a data receiving module, an algorithm module, and an external interface module, wherein the data receiving module is configured to receive the parameter on the wireless-network channel reported by the access point, and send the parameter on the wireless-network channel to the algorithm module;

the algorithm module is configured to dynamically adjust the parameter using an algorithm, and send the adjusted parameter to the external interface module of the synchronization managing unit; and the external interface module is configured to transmit the adjusted parameter to each service-flow channel via a scheduling instruction.

In an embodiment, the access-network controller may further include a wireless-resource database configured to store the parameter on the wireless-network channel reported by each access point accessing the access-network controller.

In an embodiment, the parameter may include a serving interval S of a sub-service-flow and a transmission time T of the sub-service-flow; and dynamical adjustment of the serving interval S and the transmission time T by the algorithm module may include at least one of the following: power control, handover control, admission control, packet scheduling, load control, and congestion control.

The disclosure further provides a method for synchronous service-flow transmission in a heterogeneous network, including steps of collecting and reporting a parameter on a wireless-network channel; and dynamically adjusting the received parameter on the wireless-network channel, and transmitting the adjusted parameter to each service-flow channel to implement synchronization between service-flows.

In an embodiment, the collecting and reporting a parameter on a wireless-network channel may be:

collecting, by an access point, the parameter on the wireless-network channel by periodic polling; and reporting, by the access point, the collected parameter on the wireless-network channel to a data receiving module of a synchronization managing unit in an access-network controller, wherein the parameter may include a serving interval S of a sub-service-flow and a transmission time T of the sub-service-flow.

In an embodiment, the dynamically adjusting the received parameter on the wireless-network channel may be:

sending, by the data receiving module of the synchronization managing unit, the serving interval S and the transmission time T on the wireless-network channel to an algorithm module of the synchronization managing unit; dynamically adjusting, by the algorithm module, the parameters S, T using an algorithm; and sending, by the algorithm module, the adjusted parameters to an external interface module of the synchronization managing unit, wherein dynamical adjustment of the parameters S and T by the algorithm module may include at least one of the following: power control, handover control, admission control, packet scheduling, load control, and congestion control.

In an embodiment, the method may further include:

storing, by a wireless-resource database of the access-network controller, the parameters S, T on the wireless-network channel reported by each access point accessing the access-network controller.

In an embodiment, the dynamically adjusting the received parameter on the wireless-network channel may be:

determining, by the synchronization managing unit, a state of synchronization between sub-service-flows according to two received acknowledging ACK messages;

when synchronization control is required, acquiring, by the synchronization managing unit, QoS information in sending a service, and determining, by the synchronization managing unit, a synchronization-control policy to be adopted according to the QoS information; and dynamically adjusting, by the synchronization managing unit, the parameter based on the determined synchronization-control policy.

In an embodiment, the determining, by the synchronization managing unit, a synchronization-control policy to be adopted according to the QoS information may be:

performing rigorous synchronization control for a high-QoS-level service sensitive to delay; performing flexible synchronization control for a delay-tolerant medium-QoS-level service; and performing basic synchronization control for a low-QoS-level service with less requirement regarding delay.

In an embodiment, the dynamically adjusting, by the synchronization managing unit, the parameter based on the determined synchronization-control policy may be:

when a second sub-service-flow lags behind a first sub-service-flow, for a high-QoS-level service, increasing a transmission time T of the second sub-service-flow and adjusting a serving interval S of the second sub-service-flow;

for a medium-QoS-level service, increasing the parameter T of the second sub-service-flow and reducing a sending rate for sending the first sub-service-flow; and for a low-QoS-level service, reducing the parameter T of the first sub-service-flow and adjusting the parameter S of the first sub-service-flow.

In an embodiment, the transmitting the adjusted parameter to each service-flow channel may be:

transmitting, by an external interface module of a synchronization managing unit, the adjusted parameter to each service-flow channel via a scheduling instruction.

The disclosure provides a method and system for synchronous service-flow transmission in a heterogeneous network, including that: an access point collects a parameter on a wireless-network channel, and reports the parameter to a synchronization managing unit of an access-network controller; the synchronization managing unit dynamically adjusts the received parameter on the wireless-network channel, and transmits the adjusted parameter to each service-flow channel to implement synchronization between different service-flows. It is possible to implement synchronous service-flow transmission and reduce delay while increasing a system throughput. In addition, it is possible to cope with an unexpected random event encountered during transmission.

DETAILED DESCRIPTION

According to embodiments of the disclosure, an access point collects a parameter on a wireless-network channel, and reports the parameter to a synchronization managing unit of an access-network controller; the synchronization managing unit dynamically adjusts the received parameter on the wireless-network channel, and transmits the adjusted parameter to each service-flow channel to implement synchronization between different service-flows.

The disclosure is further elaborated below with reference to specific embodiments and accompanying drawings.

Figure 1:
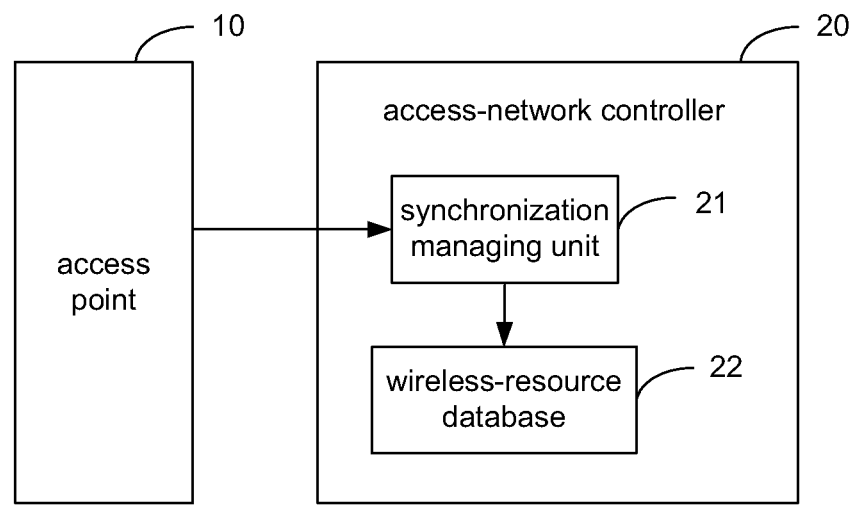
FIG. 1 is a schematic diagram of a structure of a system for implementing synchronous service-flow transmission in a heterogeneous network according to the disclosure.

Provided in the disclosure is a system for synchronous service-flow transmission in a heterogeneous network. FIG. 1 is a schematic diagram of a structure of a system for implementing synchronous service-flow transmission in a heterogeneous network according to the disclosure. As shown in FIG. 1, the system includes an access point 10 and an access-network controller 20, wherein the access-network controller 20 includes a synchronization managing unit 21.

The access point 10 is configured to collect a parameter on a wireless-network channel, and report the parameter on the wireless-network channel to the synchronization managing unit 21.

The synchronization managing unit 21 is configured to dynamically adjust the received parameter on the wireless-network channel using an algorithm, and transmit the adjusted parameter to each service-flow channel, to implement synchronization between service-flows.

Figure 2:
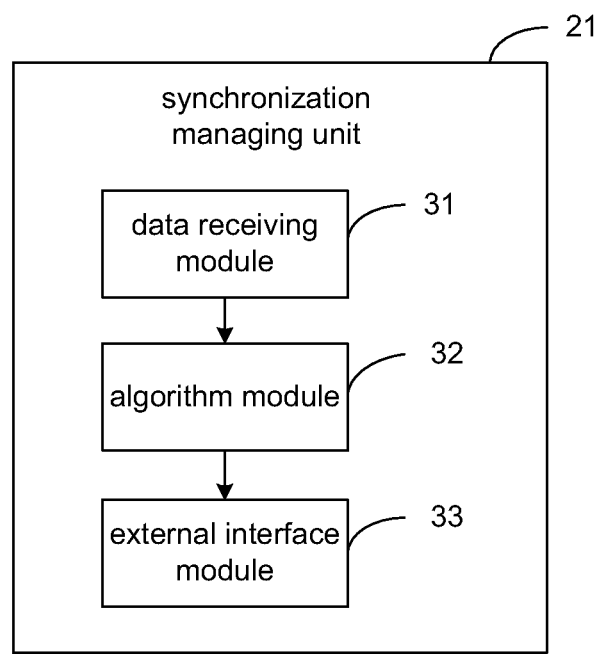
FIG. 2 is a schematic diagram of a structure of a synchronization managing unit of an access-network controller according to the disclosure.

FIG. 2 is a schematic diagram of a structure of a synchronization managing unit of an access-network controller according to the disclosure. As shown in FIG. 2, the synchronization managing unit 21 further includes a data receiving module 31, an algorithm module 32, and an external interface module 33.

The data receiving module 31 is configured to receive the parameter on a wireless-network channel reported by the access point, and send the parameter on the wireless-network channel to the algorithm module 32.

The algorithm module 32 is configured to dynamically adjust the parameter using an algorithm, and send the adjusted parameter to the external interface module 33 of the synchronization managing unit.

The external interface module 33 is configured to transmit the adjusted parameter to each service-flow channel via a scheduling instruction.

The access-network controller 20 further includes a wireless-resource database 22 configured to store the parameter on the wireless-network channel reported by each access point accessing the access-network controller.

The parameter may include a serving interval S of a sub-service-flow and a transmission time T of the sub-service-flow.

Dynamical adjustment of the parameters S and T by the algorithm module 32 include: power control, and/or handover control, and/or admission control, and/or packet scheduling, and/or load control, and/or congestion control.

Figure 3:
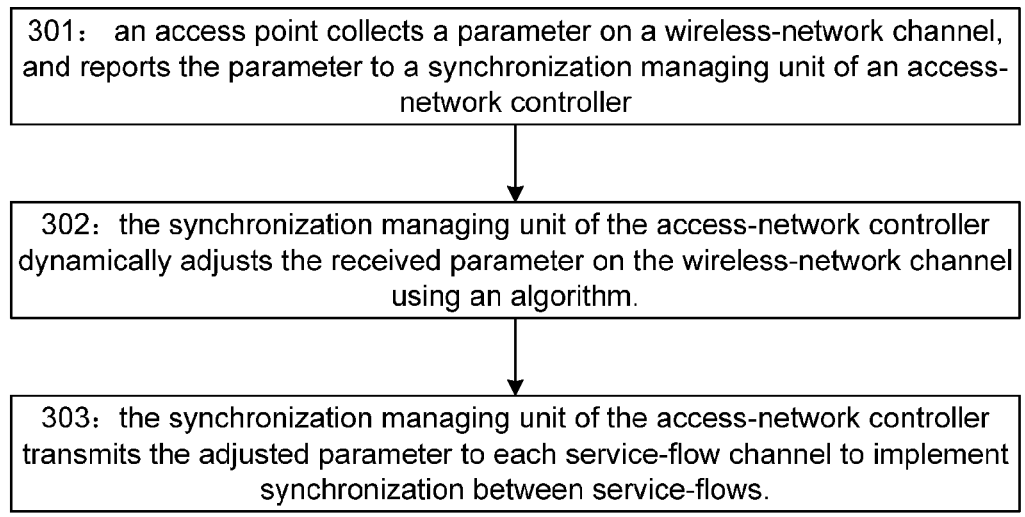
FIG. 3 is a flow chart of a method for implementing synchronous service-flow transmission in a heterogeneous network according to the disclosure.

Based on the aforementioned system, the disclosure further provides a method for synchronous service-flow transmission in a heterogeneous network. FIG. 3 is a flow chart of a method for implementing synchronous service-flow transmission in a heterogeneous network according to the disclosure. As shown in FIG. 3, the method includes steps as follows.

Step 301: an access point collects a parameter on a wireless-network channel, and reports the parameter to a synchronization managing unit of an access-network controller.

Figure 4:
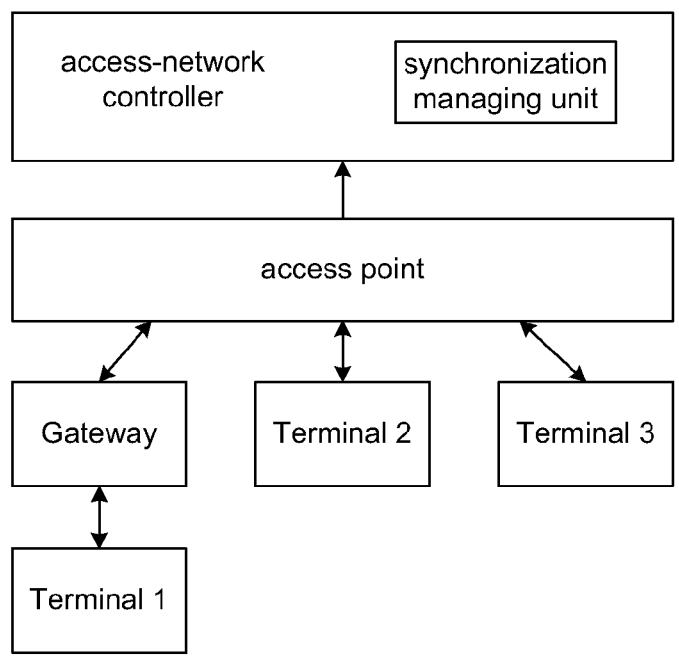
FIG. 4 is a schematic diagram showing the networking in a method for implementing synchronous service-flow transmission in a heterogeneous network according to the disclosure.

Specifically, there are two kinds of terminals for receiving respective sub-service-flows; one is a ubiquitous terminal device directly accessing a communication network, such as Terminal 3 and Terminal 2 as shown in FIG. 4; the other is a gateway through which a Local Area Network (LAN) accesses the communication network, wherein Terminal 1 in FIG. 3 is any terminal in the LAN. After completing download of the respective sub-service-flows, terminals for receiving respective sub-service-flows, such as the gateway, Terminal 3, and Terminal 2, can accomplish service-flow synthesis by aggregation and reconstruction. The gateway, Terminal 3, and Terminal 2 may access the access-network controller via a same access point or via different access points, and then together access a same core network.

The access point is a wireless access point on a wireless-network channel. The access point collects the parameter on the wireless-network channel by periodic polling. The parameter may include a serving interval S of a sub-service-flow and a transmission time T of the sub-service-flow. A minimal serving interval S is selected by measuring a sub-service-flow. The transmission time T in each sending of a sub-service-flow may be calculated according to various parameters such as S, an average service rate, a size of a maximal service data unit, a physical transmission rate, time overhead and the like. T represents a number of packets sent in a single competition period of the wireless-network channel; the greater the T, the more data packets are sent in a single competition period, and the faster the sending rate is. T=f (S, average service rate, the size of maximal service data unit, physical transmission rate, time overhead), that is, T is calculated by the serving interval S, the average service rate, the size of the maximal service data unit, the physical transmission rate, and the time overhead of each sub-service-flow, wherein the average service rate is calculated according to an average rate in previous service transmission; the access point may acquire a parameter such as the size of the maximal service data unit, the physical transmission rate, the time overhead and the like directly from an MAC layer. Furthermore, due to impact of a factor such as capacity and load of a transmitting channel, the transmission time T in transmitting the sub-service-flow on an adopted wireless-network channel may change dynamically.

The access point on each wireless-network channel reports the collected parameters S and T on the wireless-network channel to a data receiving module in the synchronization managing unit of the access-network controller. In the disclosure, if the wireless-network channel is of Wireless Local Area Networks (WLAN), the access point may acquire the parameters S and T via the MAC layer of the wireless-network channel through a wireless access point; if the wireless-network channel is a channel of another wireless-network, for example, Global System of Mobile communication (GSM), then the access point may obtain the parameters S and T through a Base Station (BS).

Step 302: the synchronization managing unit of the access-network controller dynamically adjusts the received parameter on the wireless-network channel using an algorithm.

Specifically, the access-network controller is set between an access network and the core network, and the access network may share the same core network through the access-network controller. Herein, the synchronization managing unit is embedded in the access-network controller, and dynamically adjusts, using an algorithm, the parameter on the wireless-network channel received from the access point. In addition, a wireless-resource database of the access-network controller stores the parameters S and T on the wireless-network channel reported by each access point accessing the access-network controller.

The data receiving module of the synchronization managing unit receives the parameters S and T on the wireless-network channel reported by the access point, and sends the parameters S and T to the algorithm module of the synchronization managing unit. The algorithm module is responsible for performing on the parameters S and T using the algorithm, dynamical adjustment including power control, handover control, admission control, packet scheduling, load control, and/or congestion control, etc. Power control is used to maintain a minimal level of interference at a network interface to ensure a requirement of a user on OoS. Handover control is used to handle user mobility to ensure service continuity during inter-cell/inter-system handover of the user and to achieve a predetermined requirement on QoS (Quality of Service). Admission control is the requirement on expected QoS, and is used to ensure that there is an idle wireless resource for bearing a newly added service and a handover service. Packet scheduling is used to ensure proper use of available system resources by each packet user, and allocates a data rate and a packet length for each user. Load control is used to maintain the use of wireless resources of a network within a given constraint. Congestion control is used to ensure a system load below a stable threshold, specifically by temporarily reducing QoS of certain services with low priority, etc.

After dynamically adjusting the received parameter on the wireless-network channel using the algorithm, the algorithm module sends the adjusted parameter to an external interface module of the synchronization managing unit.

S303: the synchronization managing unit of the access-network controller transmits the adjusted parameter to each service-flow channel to implement synchronization between service-flows.

Specifically, the external interface module of the synchronization managing unit receives the adjusted parameter sent by the algorithm module, and transmits the adjusted parameter to each service-flow channel via a scheduling instruction to implement synchronization between service-flows.

Embodiment

Figure 5:
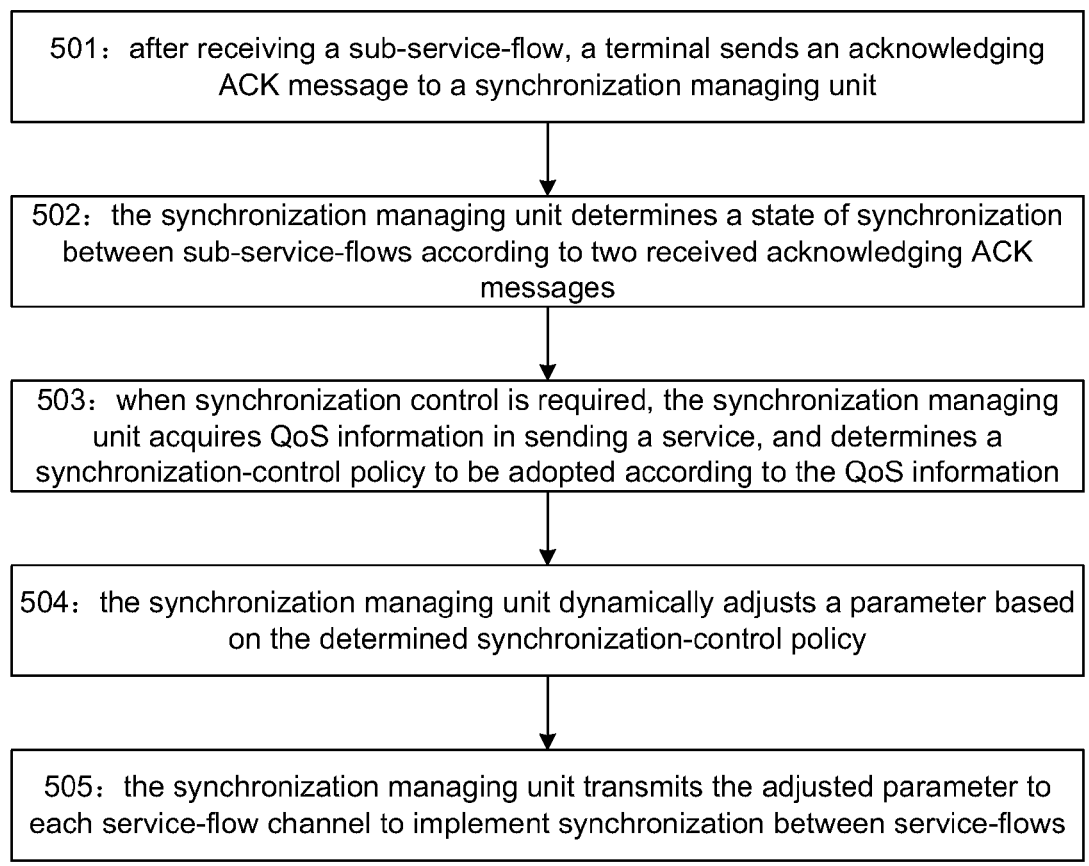
FIG. 5 is a flow chart of a method for implementing synchronous service-flow transmission in a heterogeneous network according to an embodiment of the disclosure.

FIG. 5 is a flow chart of an embodiment of a method for implementing synchronous service-flow transmission in a heterogeneous network according to the present disclosure. In this embodiment, parameters S1, T1 correspond to a sub-service-flow transmitted by a WLAN, and parameters S2, T2 correspond to a sub-service-flow transmitted by a GSM; a synchronization managing unit calculates proper [S11, T11, S22, T22] actually used on a wireless-network channel according to [S1, T1, S2, T2] to dynamically adjust sub-service-flow transmission. As shown in FIG. 5, the method includes steps as follows.

Step 501: after receiving a sub-service-flow, a terminal sends an acknowledging ACK message to a synchronization managing unit.

Specifically, after receiving the sub-service-flow, the terminal for receiving a service may return the acknowledging ACK message to the synchronization managing unit of an access-network controller by a receiving link.

Step 502: the synchronization managing unit determines a state of synchronization between sub-service-flows according to two received acknowledging ACK messages.

Specifically, an algorithm module of the synchronization managing unit of the access-network controller determines the state of synchronization between sub-service-flows by comparing time of receiving a present acknowledging ACK message and time of receiving a last acknowledging ACK message. For example, the two ACK messages are received from two receiving links at t1 and t2, respectively. If t1=t2, then it indicates that the two sub-service-flows are already synchronized and no synchronization control is performed in a current period; if t1>t2, it indicates that sub-service-flow 2 lags behind sub-service-flow 1, and thus certain synchronization control is required for sub-service-flow 2 to implement synchronous service-flow transmission.

Step 503: when synchronization control is required, the synchronization managing unit acquires QoS information in sending a service, and determines a synchronization-control policy to be adopted according to the QoS information.

Specifically, the algorithm module of the synchronization managing unit may acquire the QoS information in sending the service from a Media Access Control (MAC) address of a sub-service-flow that is about to be sent, and determines the synchronization-control policy to be employed according to the QoS information. For example, in this embodiment, services are divided according to three QoS levels, namely, a high-QoS-level service sensitive to delay, for which rigorous synchronization control is required, such as synchronization between a video and an audio; a medium-QoS-level service, for which flexible synchronization control is required, wherein the medium-QoS-level service can tolerate a certain degree of delay, such as synchronization in matching a picture and a text; a low-QoS-level service for which basic synchronization control is required, wherein the low-QoS-level service has less requirement regarding delay, such as synchronization of data, files and the like.

Step 504: the synchronization managing unit dynamically adjusts a parameter based on the determined synchronization-control policy.

Specifically, the algorithm module of the synchronization managing unit dynamically adjusts the parameter based on the determined synchronization-control policy. When sub-service-flow 2 lags behind sub-service-flow 1, for a high-QoS-level service sensitive to delay, it is required to increase a sending rate for sending a slow service-flow to synchronize the slow service-flow with a fast service-flow, for example, parameter T of sub-service-flow 2 is increased and parameter S of sub-service-flow 2 is adjusted to increase the sending rate for sending sub-service-flow 2; for a medium-QoS-level service, it is required to increase parameter T of sub-service-flow 2 and properly reduce the sending rate for sending sub-service-flow 1; for a low-QoS-level service, synchronization between sub-service-flow 1 and sub-service-flow 2 may be eventually implemented by reducing the parameter T of sub-service-flow 1 and adjusting the parameter S of sub-service-flow 1 to reduce the sending rate for sending sub-service-flow 1.

An adjusted amount of the transmission time T may be obtained using an equation $\Delta T = \alpha |t_1 - t_2| + \beta \Delta S$, wherein parameters $\alpha$, $\beta$ for correction may be configured according to a specific network environment, and correction may be performed during establishing a network connection; $\Delta S$ is the amount of change in S, which is a further supplement to the adjustment of T.

In addition, the process of dynamically adjusting the parameter for implementing synchronization may not be completed in one period; service-flow synchronization may be completed eventually by a coarse adjustment in one period plus a fine adjustment in one or two periods.

In this step, the transmission time T of a service with a relatively low QoS level is reduce during sending of the service so as to leave more channel resources to a high-QoS-level service transmitted simultaneously in channel competition to implement proper and efficient utilization of wireless resources.

Step 505: the synchronization managing unit transmits the adjusted parameter to each service-flow channel to implement synchronization between service-flows.

Specifically, an external interface module of the synchronization managing unit transmits the adjusted parameters [S11, T11, S22, T22] to each service-flow channel via a scheduling instruction, and then a sub-service-flow on each service-flow channel will be transmitted according to the new parameters [S11, T11, S22, T22] to implement synchronization between service-flows.

For example, the parameters [S11, T11, S22, T22] obtained by dynamically adjusting the parameters S1, T1 and S2, T2 are as shown in Table 1.

TABLE 1

| S1, T1 | S2, T2 | Adjusted S1, T1 | Adjusted S2, T2 | Ideal status after adjustment | Effect after adjustment |
|---|---|---|---|---|---|
| 2us, 5s | 1us, 8s | 1us, 7s | 1us, 8s | S1, T1 to 1us, 8s (same as S2, T2) | serving interval S1 is reduced, transmission time T1 obtained by competition is increased, the transmission rate is increased, and transmission on the two channels is synchronized as much as possible |
| 2us, 5s | 1us, 8s | 1us, 5s | 1us, 6s | S1, T1 to 1us, 6s (same as S2, T2) | Owing to a busy channel, adjusted transmission time T2 is reduced by competition, and the transmission rate is reduced as |

TABLE 1-continued

| S1, T1 | S2, T2 | Adjusted S1, T1 | Adjusted S2, T2 | Ideal status after adjustment | Effect after adjustment |
|---|---|---|---|---|---|
| 2us, 5s | 1us, 8s | 1us, 8s | 1us, 10s | S1, T1 to 1us, 9s; S2, T2 to 1us, 9s (same) | well, and transmission on the two channels is synchronized as much as possible Owing to an idle channel, the adjusted transmission time T2 is increased by competition, and meanwhile parameters S1, T1 are adjusted, such that transmission on the two channels is synchronized as much as possible |

It can be seen from Table 1 that transmission is synchronized as much as possible by adjusting parameters S, T dynamically, so that a sub-service-flow receiving terminal can receive the sub-service-flows as simultaneously as possible, reduce delay in aggregation as much as possible, and synchronously present the service to a user in a short time. Meanwhile, by dynamically adjusting the parameters S, T, both waiting of services with different levels and unprocessed packet services are regular, which can prevent occurrence of a certain unexpected event, such as packet loss in competition, unexpected delay (since S, T are calculated according to actual states of sub-service-flow transmission and of a network), thereby increasing a system throughput. Such QoS is vital for a video service.

What described are merely embodiments of the disclosure and is not intended to limit the scope of the disclosure. Any modification, equivalent substitution and improvement made within the teaching of the disclosure should fall within the protection scope of the disclosure.

The invention claimed is:

1. A system for synchronous service-flow transmission in a heterogeneous network, comprising an access point and an access-network controller, wherein the access-network controller comprises a synchronization managing unit,
   wherein the access point is configured to collect a parameter used for transmitting a service-flow on a wireless-network channel, and report the parameter to the synchronization managing unit,
   wherein the synchronization managing unit comprises: a data receiving module, an algorithm module, and an external interface module,
   wherein the data receiving module is configured to receive the parameter reported by the access point, and send the received parameter to the algorithm module;
   wherein the algorithm module is configured to dynamically adjust, using an algorithm, the parameter sent by the data receiving module, and send the dynamically adjusted parameter to the external interface module; and
   wherein the external interface module is configured to synchronize service-flow transmission by applying the dynamically adjusted parameter via a scheduling instruction,
   wherein the parameter comprises a serving interval S and a transmission time T used for transmitting the service-flow on the wireless-network channel,
   wherein the algorithm module is configured to perform, on the serving interval S and the transmission time T, dynamical adjustment comprising at least one of: power control, handover control, admission control, packet scheduling, load control, and congestion control.

2. The system according to claim 1, wherein the access-network controller further comprises
   a wireless-resource database configured to store the parameter reported by the access point accessing the access-network controller.

3. A method for synchronous service-flow transmission in a heterogeneous network, comprising:
   collecting, by an access point, a parameter used for transmitting a service-flow on a wireless-network channel by periodic polling, and reporting the parameter to a data receiving module of a synchronization managing unit in an access-network controller;
   sending, by the data receiving module, the parameter to an algorithm module of the synchronization managing unit;
   dynamically adjusting, by the algorithm module using an algorithm, the parameter, and sending the dynamically adjusted parameter to an external interface module of the synchronization managing unit; and
   synchronizing, by the external interface module via a scheduling instruction, service-flow transmission by applying the dynamically adjusted parameter,
   wherein the parameter comprises a serving interval S and a transmission time T used for transmitting the service-flow on the wireless-network channel,
   wherein the dynamically adjusting, by the algorithm module using an algorithm, the parameter comprises:
   performing, on the serving interval S and the transmission time T, dynamical adjustment comprising at least one of: power control, handover control, admission control, packet scheduling, load control, and congestion control.

4. The method according to claim 3, further comprising:
   storing, by a wireless-resource database of the access-network controller, the parameter reported by the access point accessing the access-network controller.

5. A method for synchronous service-flow transmission in a heterogeneous network, comprising:
   collecting a parameter used for transmitting a service-flow on a wireless-network channel;
   dynamically adjusting the parameter; and
   synchronizing, via a scheduling instruction, service-flow transmission by applying the dynamically adjusted parameter,
   wherein the dynamically adjusting the parameter is:
   determining, by a synchronization managing unit, a state of synchronization between two service-flows according to two received acknowledging ACK messages;

when synchronization control is required, acquiring, by the synchronization managing unit, QoS information on QoS required by a service being sent;

determining, by the synchronization managing unit, a synchronization-control policy to be adopted according to the QoS information; and performing, by the synchronization managing unit, dynamic parameter adjustment based on the determined synchronization-control policy.

6. The method according to claim 5, wherein the performing, by the synchronization managing unit, dynamic parameter adjustment based on the determined synchronization-control policy comprises: in response to determining that a second service-flow lags behind a first service-flow, performing rigorous synchronization control for a high-QoS-level service sensitive to delay, by increasing a transmission time T of the second service-flow and adjusting a serving interval S of the second service-flow to increase a sending rate for sending the second service-flow;

performing flexible synchronization control for a delay-tolerant medium-QoS-level service, by increasing the parameter T of the second service-flow and reducing a sending rate for sending the first service-flow; and performing basic synchronization control for a low-QoS-level service with less requirement regarding delay, by reducing the parameter T of the first service-flow and adjusting the parameter S of the first service-flow to reduce the sending rate for sending the first service-flow.

* * * * *